United States Patent Office 3,511,877
Patented May 12, 1970

3,511,877
PHENOXYACETIC ACID DIETHYLAMIDES
Winfried Arnold, Oberwil, and Charles J. Morel, Arlesheim, Basel-Land, Switzerland, assignors to Geigy Chemical Corporation, Ardsley, N.Y., a corporation of New York
No Drawing. Continuation-in-part of application Ser. No. 624,625, Mar. 20, 1967, which is a continuation of application Ser. No. 431,214, Feb. 8, 1965. This application Apr. 3, 1969, Ser. No. 813,303
Int. Cl. C07c 95/00
U.S. Cl. 260—490    5 Claims

ABSTRACT OF THE DISCLOSURE

Substituted phenoxyacetic acid diethylamides are useful as short-acting, quickly metabolized anesthetic agents. An illustrative embodiment is 2-methoxy-4-(3'-acetoxypropyl)phenoxyacetic acid diethylamide.

CROSS-REFERENCE

This is a continuation-in-part of copending application, Ser. No. 624,625 filed Mar. 20, 1967, which in turn is a continuation of application, Ser. No. 431,214, filed Feb. 8, 1965, now abandoned.

DETAILED DESCRIPTION

The present invention pertains to compounds of the formula

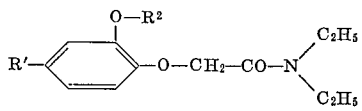

wherein:

R' is 3-acetoxy-propyl or 3-acetoxy-1-propenyl, and
R$^2$ is methyl or ethyl.

The compounds of Formula I are produced by acetylation of a hydroxy compound of the formula

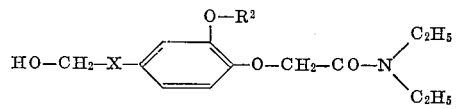

wherein:

X is ethylene or vinylene; and
R$^2$ is as defined above.

One way to obtain a compound of Formula I consists in esterifying a hydroxyl compound of Formula II with acetic acid; (a) in the presence of a catalyst such as concentrated sulfuric acid, dry hydrogen chloride, phosphoric acid or p-toluenesulfonic acid, (b) in excess acetic acid, (c) in the presence of a carbodiimide such as dicyclohexyl carbodiimide or di-p-tolyl carbodiimide, or (d) in the presence of N,N'-carbonyl-di-imidazole in a solvent such as dry dioxan, tetrahydrofuran or dimethyl formamide. Instead of the free acetic acid, a reactive functional derivative thereof, such as a halide or acid anhydride may be employed, in the presence of an acid binding agent, which when liquid can be used in an excess as solvent. Suitable acid binding agents include pyridine and triethylamine or potassium carbonate in a solvent or diluent such as benzene, toluene or acetone.

Another variation of the process for the acetylation of hydroxyl compounds of general Formula II consists in reacting them with ketene or with a compound which liberates ketene. Suitable for this reaction is, for instance, acetic acid isopropenyl ester. The reaction is preferably performed in the presence of a catalyst such as concentrated sulfuric acid, p-toluenesulfonic acid or sodium acetate, and in a solvent or diluent such as acetone or dioxan.

If desired, a compound of general Formula I, wherein R is represented by the 3-acetoxy-1-propenyl radical, is reduced to the corresponding compound with the 3-acetoxy-propyl radical R. The reduction is performed, for example, by means of hydrogen in the presence of a catalyst such as Raney nickel in a lower alkanol or dioxan, at a temperature of from about 20 to about 100° C. and under a pressure of from about 1 to about 100 atmospheres.

To produce a compound of Formula II, a substituted phenol of the formula

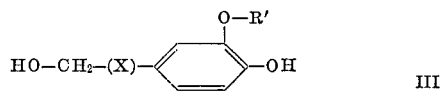

wherein X and R' have the meanings given above, is allowed to react, in the presence of an acid-binding agent, with a reactive ester of N,N-diethyl glycolamide such as N,N-diethyl chloracetamide, N,N-diethyl bromacetamide or N,N-diethyl-2-p-tolylsulfonyloxyacetamide. Alternatively a salt of a phenol of Formula III, particularly an alkali metal salt, can be employed. Suitable acid binding agents are, preferably, sodium hydroxide or a sodium alcoholate. Suitable solvents include lower alkanols or mixtures of alkanols and water. Other suitable acid binding agents are sodium and potassium carbonate in acetone or another organic solvent. Also the sodium salts of the phenols of Formula III can be used as starting materials and, in this case, a solvent not containing hydroxyl groups such as benzene, toluene, xylene or, particularly, dimethyl formamide, is used.

Of the compounds of Formula III, 3-(3'-methoxy-4'-hydroxy-phenyl)-2-propen-1-ol (coniferyl alcohol) and 3-(3'-methoxy-4'-hydroxy-phenyl)-1-propanol (dihydroconiferyl alcohol) are known. The 3'-ethoxy-analogues are obtained analogously to procedures used for the preparation of the known 3'-methoxy compounds.

The substituted phenoxyacetic acid diethylamides of Formula I demonstrate the properties of short-acting anesthetics in warm-blooded animals, particularly mammals, when administered parenterally, and are thus useful as anesthetic agents.

In actual use, the compounds of Formula I are administered to mammals for the purpose of effecting a short but deep narcosis necessary for short but painful surgical operations. They are particularly good anesthetic agents because they are well suited for administration in the form of solutions for intravenous injection; they can be administered quickly, and they possess good vein compatibility.

Example 1.—2-methoxy-4-(3'-acetoxypropyl)phenoxyacetic acid diethylamide (a) A solution of 22.8 g. of 3-(3'-methoxy-4'-hydroxyphenyl)-1-propanol (dihydroconiferyl alcohol) in 100 ml. of anhydrous ethanol is added to a solution of 2.9 g. of sodium in 100 ml. of anhydrous ethanol and the mixture is refluxed for 15 minutes. 0.5 g. of sodium iodide and 20.6 of chloroacetic acid diethylamide are added, the latter dropwise, and the whole is refluxed until the reaction of the mixture is neutral. After cooling to 20°, precipitated sodium chloride is filtered off and washed with ethanol and the filtrate is evaporated in vacuo. The residue is taken up in chloroform, washed with 2 N sodium hydroxide solution and water, dried over sodium sulfate and concentrated. Distillation of the residue under 0.009 torr yields 2-methoxy-4-(3'-hydroxypropyl)-phenoxyacetic acid diethylamide which boils at 218–223° under this pressure.

(b) A solution of 15 g. of 2-methoxy-4-(3'-hydroxypropyl)-phenoxyacetic acid diethylamide in 15 ml. of pyridine and 15 ml. of acetic acid anhydride is left standing for 48 hours at 20° after which it is evaporated at 60° under 12 torr, 24 ml. of saturated, aqueous sodium carbonate solution are added to the residue, the mixture is extracted with diethyl ether, the etheral solution is washed with saturated sodium chloride solution, dried over sodium sulfate and evaporated in vacuo. Distillation of the residue at 0.002 torr yields 2-methoxy-4-(3'-acetoxypropyl)phenoxyacetic acid diethylamide, which boils at 180–187° under this pressure. $n_D^{20°}$ 1.5155.

Example 2.—2-methoxy-4-(3'-acetoxy-1'-propenyl)-phenoxyacetic acid diethylamide (a) From 22.6 g. of 3-(3'-methoxy-4'-hydroxyphenyl)-2-propen-1-ol (coniferyl alcohol) there is obtained 2-methoxy-4-(3'-hydroxy-1'-propenyl)phenoxyacetic acid diethylamide, B.P. 213°/0.005 torr according to Example 1(a).

(b) In analogy to Example 1(b), 2-methoxy-4-(3'-acetoxy-1'-propenyl)phenoxyacetic acid diethylamide, B.P. 176–177°/0.002 torr, $n_D^{25}$ 1.5448 is prepared from 2(a).

Example 3.—2-ethoxy-4-(3'-hydroxypropyl)-phenoxyacetic acid diethylamide (a) 166.2 of 3-ethoxy-4-hydroxy benzaldehyde (bourbonal) and 230 g. of malonic acid are dissolved as well as possible by heating gently in 500 ml. of pyridine, 12 ml. of piperidine are added to the mixture and the whole is gently stirred for 3 hours at room temperature. It is then heated for about 2 hours on a steam bath until the development of carbon dioxide decreases. The reaction mixture is then poured into a mixture of 1 kg. of ice and 600 ml. of concentrated sulfuric acid whereupon the reaction product gradually crystallizes. After standing for 1 hour at 0°, the reaction product is filtered off under suction and washed three times with 120 ml. of cold water each time. The filter cake is dissolved in 250 ml. of acetone and 150 ml. of water, the solution is filtered, 400 ml. of water are added and the whole is kept for 15 hours at 0°. The 3-ethoxy-4-hydroxycinnamic acid which crystallizes out is filtered off under suction, washed with cold water and dried for 5 hours at 80° under 11 torr, M.P. 156–157°.

(b) 104 g. of 3-ethoxy-4-hydroxycinnamic acid are dissolved, while gently heating, in 520 ml. of anhydrous ethanol, the solution is saturated with dry gaseous hydrogen chloride, then refluxed for 5 hours and then evaporated in vacuo. The residue is taken up in diethyl ether, the ethereal solution is washed with saturated sodium hydrogen carbonate solution and with water, dried over sodium sulfate and evaporated in vacuo. Distillation of the residue under 0.01 torr, yields 3-ethoxy-4-hydroxycinnamic acid ethyl ester which boils at 180–185° under this pressure. It solidifies into crystals which melt at 54–56°.

(c) 44.8 g. of 3-ethoxy-4-hydroxycinnamic acid ethyl ester are dissolved in 500 ml. of anhydrous ethanol and the solution is hydrogenated at 20° under atmospheric pressure with hydrogen in the presence of palladium charcoal until no more hydrogen is taken up. The catalyst is filtered off under suction and washed with ethanol. The filtrate is evaporated in vacuo. The residue is recrystallized from diethylether/pentane whereupon 3-ethoxy-4-hydroxy-hydrocinnamic acid ethyl ester is obtained which melts at 38–39.5°.

(d) A solution of 29.2 g. of 3-ethoxy-4-hydroxy-hydrocinnamic acid ethyl ester in 50 ml. of anhydrous diethyl ether is added dropwise while vibrating well to a suspension of 9.3 g. of lithium aluminum hydride in 150 ml. of anhydrous diethyl ether, the addition being so made that the reaction mixture lightly boils. On completion of the dropwise addition, the reaction mixture is refluxed for another 3 hours while cooling with ice and vibrating well. 100 ml. of diethyl ether are then added after which carbon dioxide is introduced until saturation is reached. The ethereal phase is separated, the aqueous phase is extracted with ethyl acetate, the combined organic phases are washed with saturated sodium chloride solution dried over sodium sulfate and evaporated in vacuo. The residue is recrystallized from diethyl ether/pentane; the 3-(3'-ethoxy-4'-hydroxyphenyl)-propane-1-ol obtained melts at 63–64°.

(e) 2-ethoxy-4-(3'-hydroxypropyl)-phenoxyacetic acid diethylamide, B.P. 215°/0.06 torr, is produced from the phenyl propanol derivative obtained according to (d) analogously to 1(a) with chloroacetic acid diethylamide.

Example 4.—2-ethoxy-4-(3'-acetoxypropyl)-phenoxyacetic acid diethylamide

The above-described compound is obtained in analogy to Example 1(b) starting with 2-ethoxy-4-(3'-hydroxypropyl)phenoxyacetic acid diethylamide, prepared in accordance with Example 3(e). The obtained 2-ethoxy-4-(3'-acetoxypropyl)-phenoxyacetic acid diethylamide has a boiling point of B.P. 200–205°/0.02 torr, $n_D^{20}$ 1.5114.

Example 5.—2-ethoxy-4-(3'-acetoxy-1'-propenyl)-phenoxyacetic acid diethylamide (a) 29.0 g. of 3-ethoxy-4-hydroxycinnamic acid ethyl ester, obtained according to Example 3(b), are reduced analogously to Example 3(d), to 3-(3'-ethoxy-4'-hydroxyphenyl)-2-propen-1-ol.

(b) 2-ethoxy-4-(3'-hydroxy-1'-propenyl)phenoxyacetic acid diethylamide is produced from the reaction product of (a) analogously to Example 1(a) with chloroacetic acid diethylamide.

(c) From the reaction product of (b), 2-ethoxy-4-(3'-acetoxy-1'-propenyl)-phenoxyacetic acid diethylamide is obtained by acetylation analogously to Example 1(b).

What is claimed is:
1. A compound of the formula

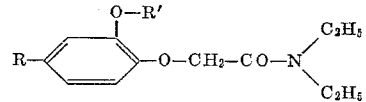

wherein:

R is 3-acetoxy-propyl or 3-acetoxy-1-propenyl, and
R' is methyl or ethyl.

2. A compound as defined in claim 1 which is 2-methoxy-4-(3'-acetoxy-propyl)phenoxyacetic acid diethylamide.

3. A compound as defined in claim 1 which is 2-ethoxy-4-(3'-acetoxy-propyl)phenoxyacetic acid diethylamide.

4. A compound as defined in claim 1 which is 2-methoxy-4-(3'-acetoxy-1'-propenyl)phenoxyacetic acid diethylamide.

5. A compound as defined in claim 1 which is 2-ethoxy-4-(3'-acetoxy-1'-propenyl)phenoxyacetic acid diethylamide.

References Cited

Chem. Abstracts, 53: 16065 bc; 54: 4498e; 55: 27, 788i; 56: 1395e–g; 57: 13253g.

LORRAINE A. WEINBERGER, Primary Examiner

V. GARNER, Assistant Examiner

U.S. Cl. X.R.

424—311